United States Patent
Kapaan et al.

(10) Patent No.: US 6,607,059 B1
(45) Date of Patent: Aug. 19, 2003

(54) SCREW ACTUATOR COMPRISING A MULTI-PURPOSE SLEEVE, AND BRAKE CALLIPER

(75) Inventors: Hendrikus Jan Kapaan, Nieuwegein (NL); Thomas Wilhelm Fucks, Röthlein (DE); Jiri Gurka, Behamberg (AT); Jérôme Dubus, La Motte Servolex (FR); Christian Boch, Chambéry (FR); Clair Druet, Drumettaz Clarafond (FR); Asbjorn Bundgart, Soborg (DK); Alberto Visconti, Varese (IT); Jacobus Zwarts, Nieuwegein (NL); Albert Van Den Kommer, Nieuwegein (NL)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/831,941
(22) PCT Filed: Nov. 16, 1999
(86) PCT No.: PCT/NL99/00703
§ 371 (c)(1),
(2), (4) Date: Jul. 6, 2001
(87) PCT Pub. No.: WO00/29760
PCT Pub. Date: May 25, 2000

(30) Foreign Application Priority Data

Nov. 17, 1998 (NL) .............................................. 1010576

(51) Int. Cl.[7] ............................................. F16D 55/08
(52) U.S. Cl. ........................ 188/72.8; 277/551; 384/477
(58) Field of Search ............................... 188/72.8, 72.1, 188/72.7, 73.1, 71.1, 71.9; 277/551, 571–574, 576; 384/477, 481, 482, 484, 485

(56) References Cited

U.S. PATENT DOCUMENTS

| 2,975,649 | A | | 3/1961 | Propst |
| 3,667,311 | A | | 6/1972 | Wysong |
| 4,258,584 | A | | 3/1981 | Haegele et al. |
| 4,557,156 | A | | 12/1985 | Teramachi ................... 74/459 |
| 4,715,262 | A | | 12/1987 | Nelson et al. |
| 4,877,113 | A | | 10/1989 | Taig |
| 5,142,929 | A | | 9/1992 | Simpson, III |
| 5,410,293 | A | * | 4/1995 | Angerfors ............... 188/1.11 L |
| 6,062,734 | A | * | 5/2000 | Bundgart ..................... 277/551 |
| 6,302,404 | B1 | * | 10/2001 | Bundgart ..................... 277/551 |

FOREIGN PATENT DOCUMENTS

| DE | 18 22 979 U | 12/1960 |
| DE | 30 40 186 A1 | 6/1982 |
| GB | 143 594 A | 6/1920 |
| GB | 559 407 A | 2/1944 |
| GB | 1 049 179 A | 11/1966 |

* cited by examiner

Primary Examiner—Pam Rodriguez
(74) Attorney, Agent, or Firm—Oliff & Berridge, PLC

(57) ABSTRACT

A screw actuator comprises a screw (1) and a nut (2) which are each provided with at least a helical groove (3,4), and a series of rollers or balls (5) which are in rolling contact with the grooves (3,4). A sleeve (6) is provided which surrounds the nut (2) at least partly. The sleeve (6) may carry a seal (7) which acts between the nut (2) and screw (1); e.g. a wiper seal. The seal (7) may be fixedly connected to the nut (2), and frictionally engage the screw (1).

32 Claims, 4 Drawing Sheets

SCREW ACTUATOR COMPRISING A MULTI-PURPOSE SLEEVE, AND BRAKE CALLIPER

The invention is related to a screw actuator, comprising a screw and a nut which are each provided with at least a helical groove, and a series of rollers or balls which are in rolling contact with said grooves.

Such actuator is generally known. The internal actuator space defined between the nut or screw is usually protected with respect to the outside by means of seals or shields. Further properties of the actuator are related to the way in which the balls are circulated, e.g. by means of inserts protruding into the groove windings, or by means of a circulation tube.

These components, i.e. seals, shields, inserts and tubes, all contribute considerably to the manufacturing costs of the actuator. It is therefore desirable to streamline the actuator production in this respect, so as to obtain reduced production costs. To that end, the actuator according to the invention is characterized by a multi-purpose sleeve which surrounds the nut at least partly, which sleeve plays a role in mounting said components. Said sleeve may even constitute said components.

For instance, the sleeve may carry a shield or seal which acts between the nut and screw. Such sleeve and seals or shields may be pre-assembled, and may be fixedly connected to the nut.

Preferably, the seal is a wiper seal. Alternatively, the sleeve functions as a carrier for a separate seal ring having the same helical groove as the rest of the nut. Said seal ring may be made of a non-metallic material with or without impregnated lubricant.

The sleeve may protrude with respect to the nut, the protruding end of the sleeve carrying the seal, or a shield.

In case the nut is provided with a support bearing, said sleeve may carry a second seal for sealing the bearing space of said bearing.

According to one of several possible embodiments, the nut of the screw actuator may comprise at least one radially oriented through-going aperture which accommodates an insert for moving the balls between axially adjacent parts of the groove. According to the invention, the sleeve retains said insert within said aperture.

Alternatively, the nut may comprise a bypass for moving the balls between the opposite ends of a multiple of windings of the grooves, wherein the sleeve at least partially defines said bypass. In particular, the sleeve may comprise a protrusion which delimits the radially outer part of a bypass tube.

Furthermore, the inner ring of the bearing may be integrated with the nut. In the screw actuator according to the invention, said bearing is an asymmetric angular contact bearing, the outer ring of which has a low shoulder at the side near the sleeve, said sleeve extending into the gap defined by said low shoulder of the outer ring and the opposite shoulder of the inner ring, the second seal engaging the inner surface of said low shoulder.

Additionally, means may be integrated in the actuator for replenishing the lubricant for the grooves and rollers or balls of the actuator. The grooves may have a somewhat deeper, through-like bottom for accommodating some grease, and the replenishing means open out in said grooves or through-like bottoms.

The invention is also related to a brake calliper comprising a screw provided with a bore, and a nut which are each provided with at least a helical groove, and a series of rollers or balls which are in rolling contact with said grooves.

According to the invention, a sleeve is provided which covers the wall of the screw bore at least partly.

The nut at one end may be closed by means of an end cap. The enclosed space may contain an amount of lubricant for lubricating the grooves of the actuator via suitable apertures, e.g. by bleeding the oil from an amount of grease. Alternatively, active pump means may be provided for expelling the grease into the grooves.

In this respect, the actuator may be sealed for life by means of said end cap, a lubricant being available in the sealed space.

The end cap may also fulfil further functions, and may for instance carry means for connection to a drive source.

The brake calliper according to the invention may comprise more than one actuator, e.g. two or four, each engaging a brake pad. Moreover, one of the nut and screw is supported rotatably with respect to the housing by means of a rolling element bearing. Preferably, each screw is connected to a piston which is slidably but non-rotatably held within a cylinder space in the housing, the nut being supported with respect to the housing by means of the rolling element bearing.

The sleeve carries a shield or a seal which acts between the nut and screw; said shield or seal is fixedly connected to the nut, and may frictionally engage the screw. The seal may be a wiper seal.

Furthermore, the sleeve may carry a sensor for sensing relative movements between the screw and the nut, e.g. relative rotation and/or translations.

The invention is furthermore related to an alternative embodiment of the brake calliper, which differs from the brake calliper described before in that the screw has a bore, and in that a sleeve is provided which covers the wall of the screw bore at least partly.

In particular, the screw may now be provided with at least one radially oriented through-going aperture comprising an insert for moving the balls between axially adjacent parts of the grooves, wherein the sleeve retains said insert within said aperture.

In this case, the screw is provided with a support bearing, the outer ring of the support bearing being integrated in the screw. The inner ring is accommodated within the screw bore. Furthermore, the sleeve may be prolonged by means of a small diameter tube part which extends through the inner ring of the bearing. Said tube part may be used for transferring a drive action onto the screw.

The invention will further be described with reference to the embodiments shown in the figures.

Figure 1:
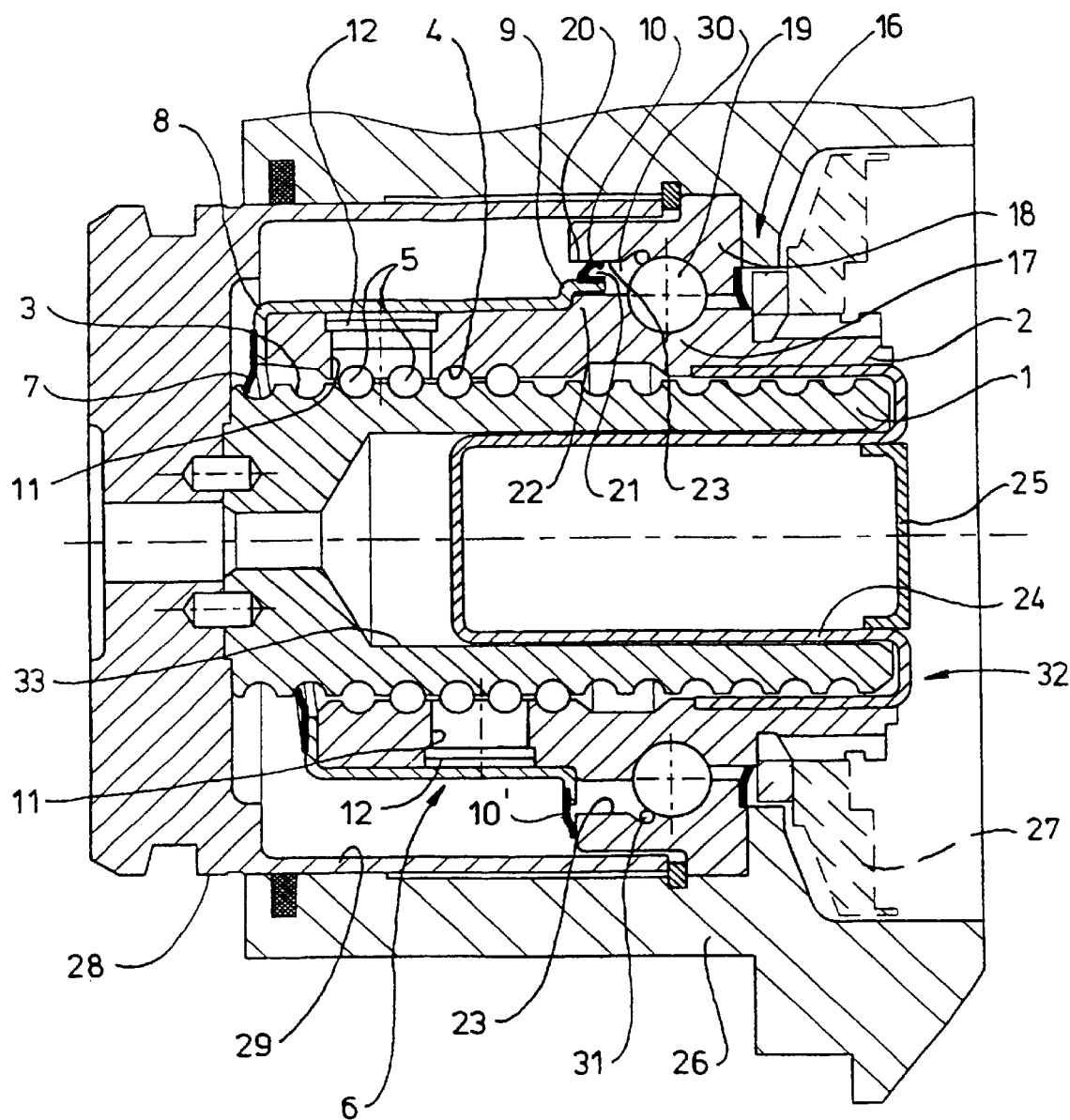
FIG. 1 shows a partial view of a first actuator according to the invention.

The actuator shown in FIG. 1 comprises a screw 1, which by means of balls 5 engages the nut 2. Both the screw 1 and the nut 2 have helical grooves 3, 4, wherein the balls 5 are accommodated.

The balls 5 are switched over between adjacent parts of the grooves 3, 4 by means of appropriately shaped inserts 12, which are accommodated in throughgoing apertures 11 in the nut 2.

The nut 2 carries an integrated inner ring 17 of the asymmetric angular support ball bearing 16, the outer ring 18 of which is accommodated in the housing 26 wherein the actuator in question has been accommodated.

The nut can be connected to a driving means 27, which e.g. by means of the reduction gear mechanism is connected to an electric motor.

The screw 1 is connected to a piston 28 which is slidingly but non-rotatably accommodated in the cylindrical space 29 in the housing 26.

According to the invention, a sleeve 6 is fitted around part of the nut 2. Said sleeves 6 serves several purposes. First of all, the sleeve 6 acts to keep the inserts 12 in the proper place within the throughgoing apertures 11.

Furthermore, at its protruding end 8 the sleeve 6 carries a seal 7, in particular a so called wiper seal, for sealing the space containing the grooves 3, 4 between the screw 1 and the nut 2.

Additionally, the sleeve 6, opposite the end where the wiper seal 7 is mounted, carries a seal 10 for sealing the bearing space 30 defined between the outer bearing ring 18 and the inner bearing ring 17.

In the embodiment shown, said outer ring 18 comprises a low shoulder 20, the diameter of which is equal to the maximal diameter of the raceway of the outer ring 18. By means of a clipring 31, the balls 19 of the bearing 16 are held in place.

The inner bearing ring 17 comprises a low shoulder 22, such that the sleeve 6 in particular the end 9 thereof, together with seal 10 may protrude in between said shoulders 20, 22.

According to the first embodiment, shown in the upper part of FIG. 1, the seal 20 in the gap 21 between the shoulders 20, 22 engages the inner surface 23 of the low shoulder 20.

According to a second possibility, shown in the lower half of FIG. 1, the seal 10' may also engage a radial face of the outer ring 18.

The nut 2 is furthermore closed by means of an end cap 32, which in this embodiment has a part 24 which protrudes in the bore 33 of the screw 1. Also this protruding part 24 can be closed off by means of a lid 25, and may for instance contain an amount of lubricant which bleeds to the grooves 3, 4 via apertures (not shown).

Figure 2:
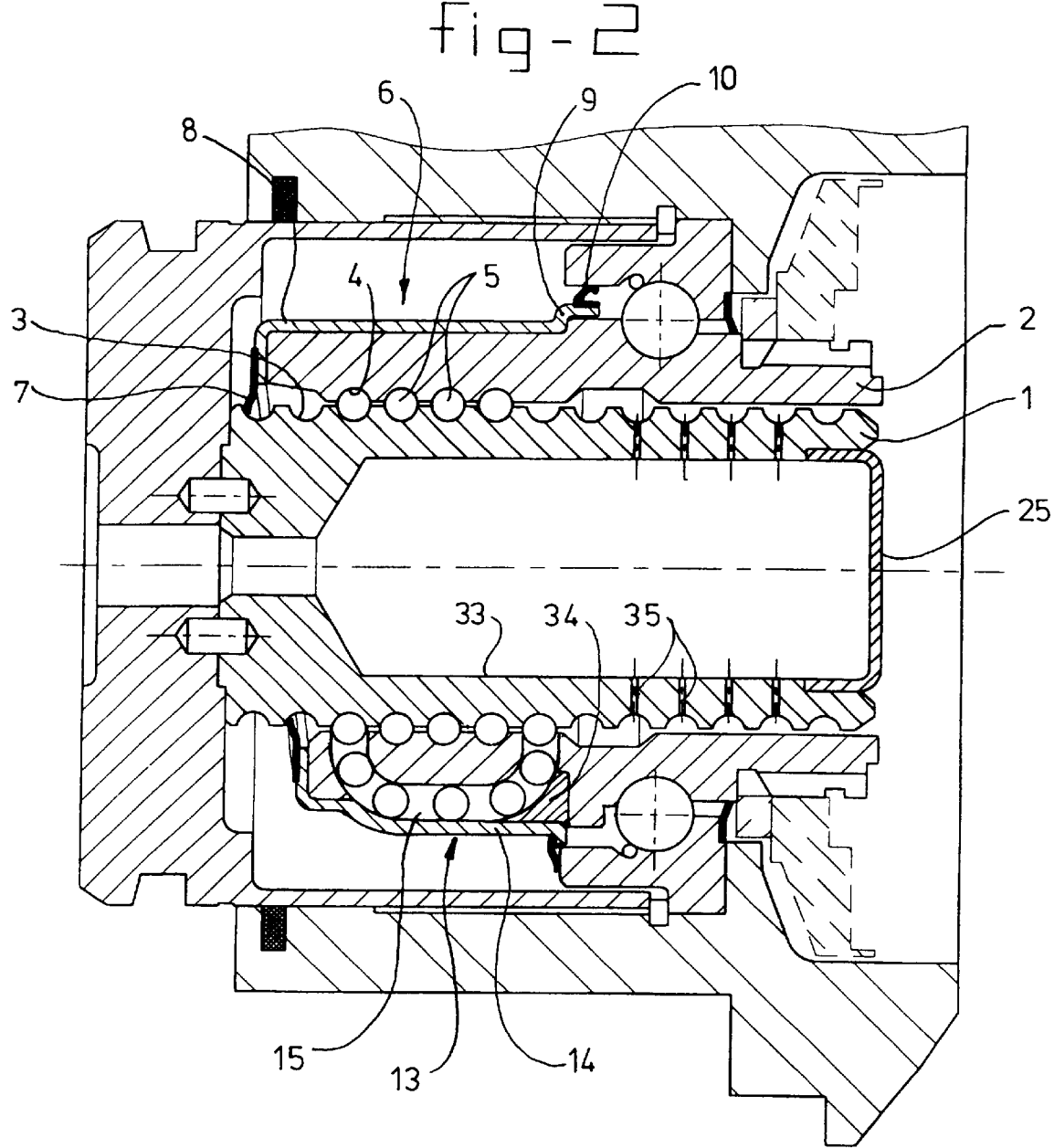
FIG. 2 shows a partial view of a second embodiment of the actuator.

The embodiment shown in FIG. 2 is to a large degree similar to the embodiment of FIG. 1, however, the circulation of the balls 5 takes place by means of a bypass tube 15. This bypass tube 15 is defined between the outer surface of the nut 2 and the protrusion 14 which together define the bypass 13. By means of the suitably shaped end piece 34, the balls 5 are set back into the grooves 3, 4.

The screw has a bore 33, wherein an amount of grease can be accommodated. Via apertures 35 which open out in the groove 3, the screw actuator may be lubricated by bleeding.

Figure 3:
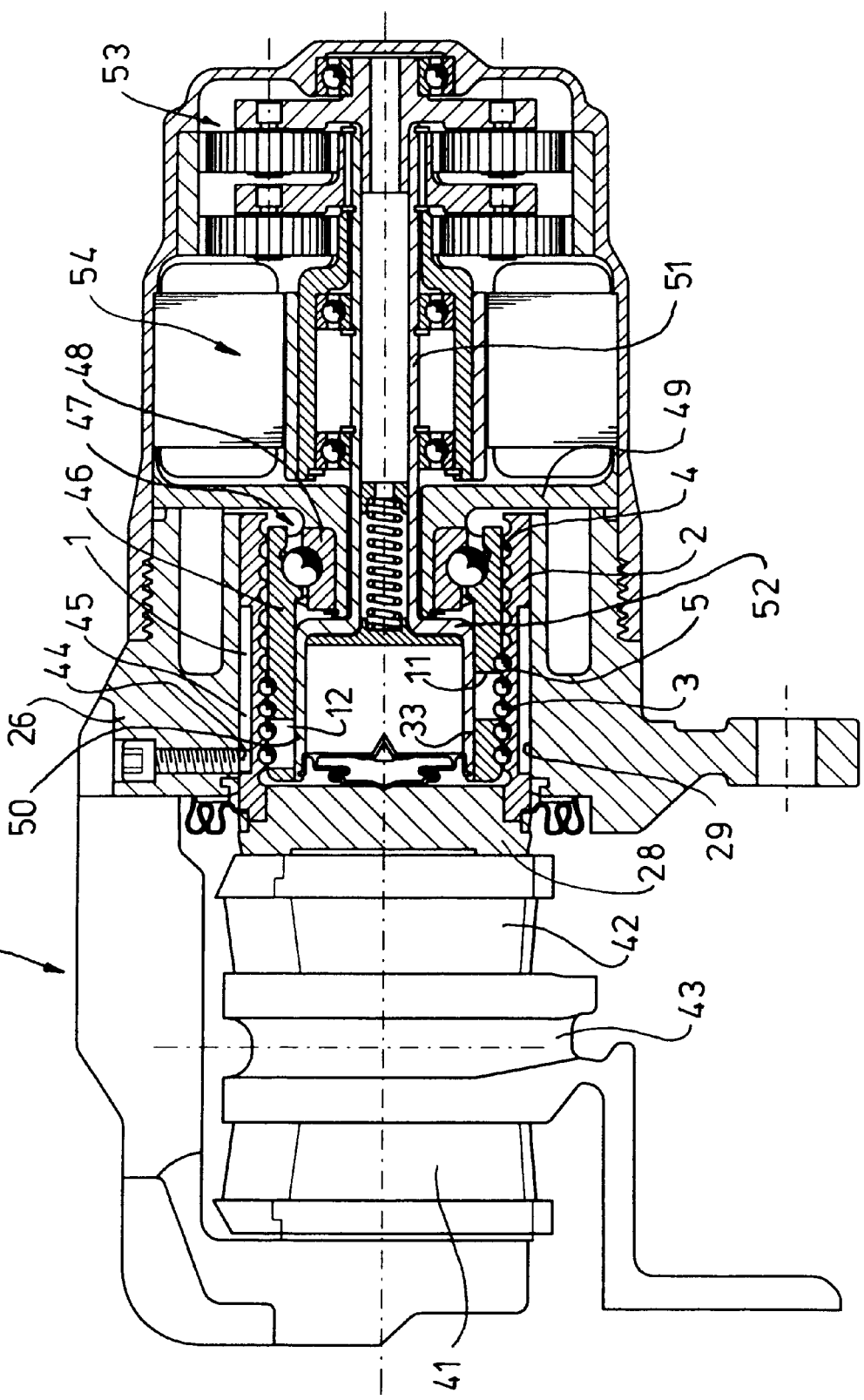
FIG. 3 shows a brake calliper comprising an actuator according to the invention.
Figure 4:
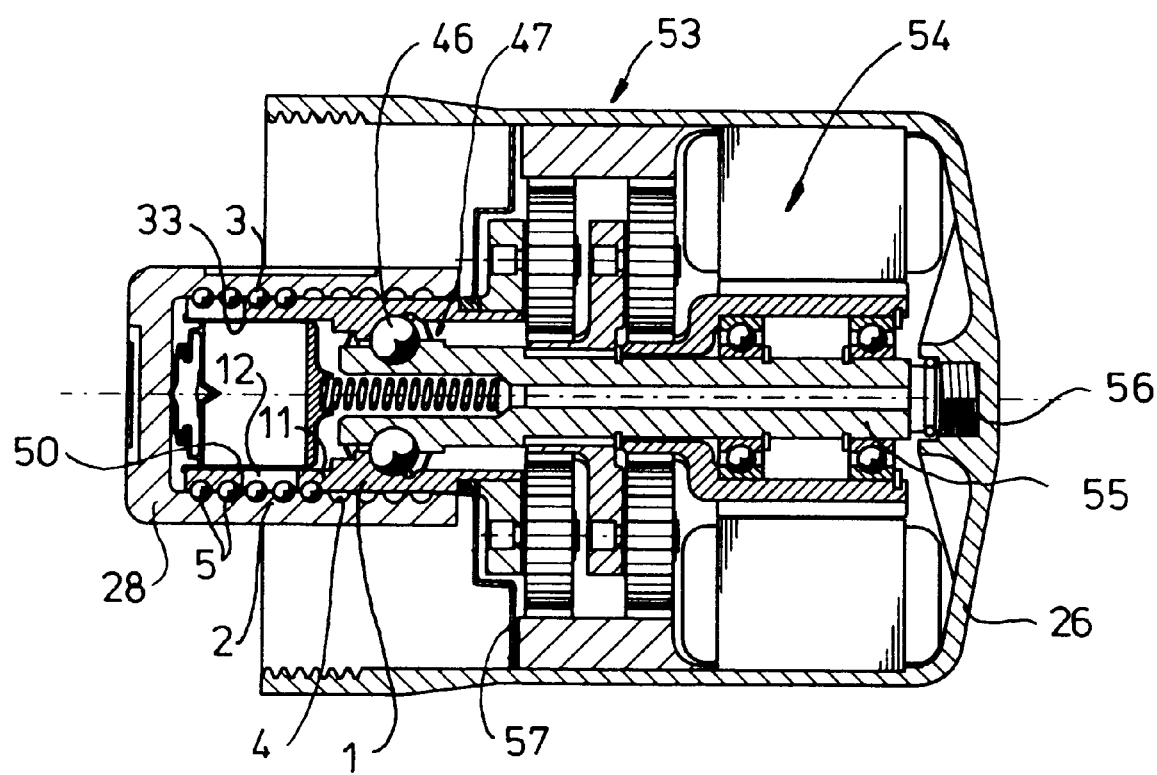
FIG. 4 shows a second embodiment of the brake calliper.

The embodiments of FIG. 3 and 4 show a brake calliper, comprising a claw piece 40 carrying two opposite brake pads 41 and 42. Between the brake pads 41 and 42, a brake disc 43 of a disc brake is accommodated.

One of the brakepads 42 is connected to the piston 28 of a screw actuator. Said piston is slidably but non-rotatably held within the bore 29 in the housing 26 of the clawpiece 40. By means of a tenon 44 and groove 45, the sliding but non-rotating movement is allowed.

The nut 2 of the screw actuator is integrated in the piston 28, its screwthreaded groove by means of the balls 5 engaging the screwthreaded groove 3 of the screw 1 of the actuator.

The screw 1 is integrated with the outer ring 46 of angular contact support ball bearing 47. The inner ring 48 thereof is supported by means of a radial wall 49 with respect to the housing 26.

According to the invention, the screw has throughgoing apertures 11, into which an insert 12 has been accommodated for shifting the balls 5 between adjacent parts of the grooves 3, 4.

According to the invention, an internal sleeve 50 has been accommodated within the internal bore 33 of the screw. This internal sleeve 50 acts to keep the inserts 12 in their proper position.

According to the embodiment of FIG. 3, sleeve 50 is connected to a tubular support shaft 51 via a radially narrowed down part. Via the reduction gear means 53, the opposite end of this tubular shaft 51 is driven by motor 54.

In the embodiment of FIG. 4, the sleeve 50 in the internal bore 33 of the screw 1 fulfils the same function of keeping the inserts 12 in their proper place within the throughgoing apertures 11. The screw is driven by means of a motor 54 via the reduction gear mechanism 53.

The inner ring 48 of the bearing 47 is connected to a hollow support shaft 55, which is rigidly supported in the housing 26. At the end of the support shaft 55, there is a load cell 56 for measuring the axial loading force.

The external surface of the piston 28 is coated with a heat barrier material. Moreover, the reduction gear mechanism 53 and the motor are shielded by means of a suitable heat shield 57, so as to protect the moving parts of the brake calliper against the heat generated upon breaking.

What is claimed is:

1. Screw actuator, comprising a screw (1) and a nut (2) which are each provided with at least a helical groove (3, 4), and a series of rollers or balls (5) which are in rolling contact with said grooves (3, 4), a sleeve (6) is provided which surrounds the nut (2) at least partly, characterised in that the sleeve (6) carries a first seal (7) which acts between the nut (2) and screw (1), wherein the nut (2) is provided with at least one radially oriented through-going aperture (11) comprising an insert (12) that moves the balls (5) between axially adjacent parts of the groove (3, 4), and wherein the sleeve (6) retains said insert (12) within said aperture (11).

2. Screw actuator according to claim 1, wherein the first seal (7) is fixedly connected to the nut (2), and frictionally engages the screw (1).

3. Screw actuator according to claim 2, wherein the first seal (7) is a wiper seal.

4. Screw actuator according to claim 1, wherein the sleeve carries a separate seal ring having the same helical groove.

5. Screw actuator according to claim 1, wherein the sleeve (6) protrudes with respect to the nut (2), the protruding end (8) of the sleeve carrying the first seal (7), or a shield.

6. Screw actuator according to claim 1, the nut (2) being provided with a support bearing (16), wherein the sleeve (6) at the opposite end (9) carries a shield or a second seal (10) for sealing the bearing space (11) of said bearing (16).

7. Screw actuator according to claim 6, wherein the first seal (7) and the second seal (10) are at opposite ends (8,9) of the sleeve (6).

8. Screw actuator according to claim 6, wherein the bearing (16) comprises an inner ring (17) and an outer ring (18) which enclose a bearing space (11) containing rolling elements (19), said inner ring (17) being integrated with the nut (2).

9. Screw actuator according to claim 8, wherein the bearing (16) is an asymmetric angular contact bearing, the outer ring (18) of which has a low shoulder (20) at the side near the sleeve (7), said sleeve (7) extending into the gap (21) defined by said low shoulder (26) of the outer ring (18) and the opposite shoulder (22) of the inner ring (17), the second seal (10) engaging the inner surface (23) of said low shoulder (20).

10. Screw actuator according to claim 6, wherein the bearing comprises a two piece inner ring and/or a two piece outer ring.

11. Screw actuator according to claim 1, the nut (2) comprising a bypass (13) for moving the balls (5) between the opposite ends of a multiple of windings of the grooves (4, 5), wherein the sleeve (7) at least partially defines said bypass (13).

12. Screw actuator according to claim 11, wherein the sleeve comprises a protrusion (14) which delimits the radially outer part of a bypass tube (15).

13. Screw actuator according to claim 1, wherein means (24–26) are integrated in said actuator for replenishing the lubricant for the grooves (3, 4) and rollers or balls (5) of the actuator.

14. Screw actuator according to claim 1, wherein the sleeve carries a sensor for sensing relative movements between the screw and the nut.

15. Screw actuator according to claim 1, wherein the sleeve comprises at least two sleeve pieces.

16. Brake calliper for a disc brake, comprising a housing (26) which carries two opposite brake pads which enclose a gap for accommodating a brake disc, and one or more screw actuators comprising a screw (1) and a nut (2) which are each provided with at least one helical groove (3, 4), a series of rollers or balls (5) which are in rolling contact with said grooves (3, 4), a sleeve (6) being provided which surrounds the nut (2) at least partly, characterised in that the sleeve (6) carries a first seal (7) which acts between the nut (2) and screw (1), wherein the nut (2) is provided with at least one radially oriented through-going aperture (11) comprising an insert (12) that moves the balls (5) between axially adjacent parts of the groove (3, 4), and wherein the sleeve (6) retains said insert (12) within said aperture (11).

17. Brake calliper according to claim 16, wherein the nut (2) at one end is closed by means of an end cap (24).

18. Brake calliper according to claim 17, wherein the end cap carries means for connection to a drive source.

19. Brake calliper according to claim 17, wherein the actuator is sealed for life by means of the end cap (24, 25), a lubricant being available in the sealed space.

20. Brake calliper according to claim 16, wherein one of the nut (2) and screw (1) is supported rotatably with respect to the housing (26) by means of a rolling element bearing (16).

21. Brake calliper according to claim 20, wherein each screw (1) is connected to a piston (28) which is slidably but non-rotatably held within a cylinder space (29) in the housing (26), the nut (2) being supported with respect to the housing by means of the rolling element bearing (16).

22. Brake calliper according to claim 20, wherein the sleeve (6) carries a second shield or seal (10) for sealing the bearing space (30) of said bearing (16).

23. Brake calliper according to claim 22, wherein the first seal (7) and the second seal (10) are at opposite ends of the sleeve (6).

24. Brake calliper according to claim 22, wherein the bearing (16) comprises an inner ring (17) and an outer ring (18) comprising one or two parts which enclose a bearing space containing rolling elements (19), said inner ring (17) being partly or fully integrated with the nut (2).

25. Brake calliper according to claim 24, wherein the bearing (16) is an asymmetric angular contact bearing, the outer ring comprising a low shoulder (20) at the side near the sleeve (6), said sleeve (6) extending into the gap (21) defined by said low shoulder (20) of the outer ring (18) and the opposite shoulder (22) of the inner ring (17), the second shield or seal (10) engaging the inner surface (23) of said low shoulder (28).

26. Brake calliper according to claim 16, wherein the shield or first seal (7) is fixedly connected to the nut (2), and may frictionally engage the screw (1).

27. Brake calliper according to claim 16, wherein the first seal is a wiper seal (7).

28. Brake calliper according to claim 27, wherein the first seal is a non-metallic ring with or without impregnated lubricant.

29. Brake calliper according to claim 16, wherein the sleeve (6) protrudes (8) with respect to the nut (2), the protruding end (8) of the sleeve carrying a shield or the first seal (7).

30. Brake calliper according to claim 16, the nut (2) comprising a bypass (13) for moving the balls (5) between the opposite ends of a multiple of windings, wherein the sleeve (6) at least partially defines said bypass (13).

31. Brake calliper according to claim 16, wherein means are integrated in said actuator for replenishing the lubricant for the contacts between raceways and rollers or balls of the actuator.

32. Brake calliper according to claim 16, wherein the sleeve carries a sensor for sensing relative movements between the screw and the nut.

\* \* \* \* \*